(12) United States Patent
Nozaki

(10) Patent No.: US 6,520,563 B2
(45) Date of Patent: Feb. 18, 2003

(54) WEATHER STRIP

(75) Inventor: Masahiro Nozaki, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/939,650

(22) Filed: Aug. 28, 2001

(65) Prior Publication Data

US 2002/0027377 A1 Mar. 7, 2002

(30) Foreign Application Priority Data

Aug. 28, 2000 (JP) ........................................ 2000-256889

(51) Int. Cl.[7] ................................................ B60J 10/00
(52) U.S. Cl. ...................... 296/146.9; 296/76; 296/207; 49/480.1; 49/498.1
(58) Field of Search ............................. 296/146.9, 207, 296/76; 49/480.1, 498.1

(56) References Cited

U.S. PATENT DOCUMENTS

| | | | |
|---|---|---|---|
| 2,880,049 A | * 3/1959 | Tarleton | ............... 49/498.1 X |
| 3,025,576 A | * 3/1962 | Herman | ............... 49/498.1 X |
| 4,495,234 A | 1/1985 | Tominaga et al. | |
| 4,787,668 A | 11/1988 | Kawasa et al. | |
| 4,819,382 A | 4/1989 | Suzuki et al. | |
| 4,884,370 A | 12/1989 | Nozaki et al. | |
| 5,038,522 A | 8/1991 | Nozaki | |
| 5,361,542 A | * 11/1994 | Dettloff | ................ 49/498.1 X |
| 5,374,386 A | 12/1994 | Nagata | |

FOREIGN PATENT DOCUMENTS

JP 0116242 * 7/1983 .................. 296/76

* cited by examiner

Primary Examiner—Dennis H. Pedder
(74) Attorney, Agent, or Firm—Law Offices of David G. Posz

(57) ABSTRACT

A weather strip for sealing an opening portion around an opening in a vehicle body against a periphery of a closing member for closing the opening in the vehicle body. The weather strip includes a base portion and a tubular seal portion which projects outwardly from an outer surface of the base portion. The tubular seal portion includes a pair of leg portions which project outwardly from the base portion, extending portions which extend from ends of the leg portions in opposite directions along the outer side wall to have an L-shaped cross-section with the leg portion, and a seal wall for connecting ends of the extending parts into an arc-shaped cross-section. The base portion and the leg portions are composed of a solid material while the seal wall is composed of a sponge material. A boundary between the solid material and sponge material is located in each of the extending portions of the tubular seal portion.

5 Claims, 3 Drawing Sheets

WEATHER STRIP

This application is related to and claims priority from Japanese Patent Application No. 2000-256889, incorporated herein by reference.

BACKGROUND OF THE INVENTION

1. Field of the Invention

The present invention relates to a weather strip for sealing an opening portion around an opening in a vehicle body against a periphery of a closing member for closing the opening in the vehicle body.

2. Description of Related Art

To seal an opening portion of a vehicle body around an opening such as a door opening or trunk lid opening against a periphery of a closing member such as a door or trunk lid, weather strips are attached to the opening portion of the vehicle body and/or the periphery of the closing member.

As illustrated in FIG. 1, a door opening 10 which is formed in a side portion of a vehicle body is opened and closed by a rear slide door 12. A weather strip (not shown) is attached to a flange (not shown) formed around the door opening 10.

As illustrated in FIG. 2 which is taken along the line C—C of FIG. 1, a weather strip 14 includes a base portion 16 having a generally U-shaped cross-section, and a tubular seal portion 18 which projects outwardly from an outer side wall of the base portion 16. The base portion 16 is attached to a flange 20 projecting into the door opening 10.

Upon closing the door opening 10, the slide door 12 is slid from its open position along the rear side of the vehicle body toward its closed position. And just before the door opening 10 is closed, the slide door 12 is guided by a guide member provided along a lower side of the door opening 10 and is shifted inwardly into flash with the rear side of the vehicle body. At this time, an inside face of a periphery of the slide door 12 contacts and presses the seal portion 18.

The base portion 16 of the weather strip 14 is generally composed of a solid EPDM rubber or solid thermoplastic olefin elastomer (TPO), and the seal portion 18 which projects into an arc-shaped cross-section is generally composed of a sponge EPDM rubber or sponge TPO. A metal core 22 is embedded in the base portion 16.

If the seal portion 18 is entirely composed of a sponge material, the seal portion 18 is irregularly deformed because of its insufficient rigidity when the slide door 12 presses the seal portion 18. Consequently, the sealing properties of the seal portion 18 become instable. To overcome this problem, root parts of the seal portion 18 have been composed of a solid material integrally with the base portion 16.

When the weather strip 14 thus arranged is extruded integrally, the position of boundaries 24 and 26 between solid parts and sponge parts in the seal portion 18 inevitably scatters. Where the boundaries 24 and 26 are positioned too low relative to the seal portion 18, the seal portion 18 may be deformed irregularly when the slide door 12 presses the seal portion 18. On the other hand, where they are positioned too high relative to the seal portion 18, the solid root parts of the seal portion 18 exert a large counterforce against the slide door 12 upon closing the door opening 10. Consequently, a large force is required to close the slide door 12 with the result that the slide door 12 strikes on the seal portion 18 strongly, which is less preferable. In addition, the position of the boundaries 24 and 26 also inevitably scatters in the longitudinal direction of the weather strip 14, whereby the sealing pressure of the weather strip 14 may become nonuniform locally.

SUMMARY OF THE INVENTION

Accordingly, it is an object of the present invention to provide a weather strip capable of keeping stability of a seal portion despite scattering in the position of boundaries between solid parts and sponge parts therein, and effecting a uniform sealing pressure over an entire length of the seal portion while preventing a closing member from strongly striking on the seal portion upon closing an opening in a vehicle body.

The weather strip in accordance with the present invention includes a base portion, and a tubular seal portion which projects outwardly from an outer surface of the base portion. The seal portion includes a pair of leg portions, each projecting outwardly from the outer surface of an outer side wall of the base portion, extending portions which extend from ends of the leg portions in opposite directions along the outer side wall to have an L-shaped cross-section with the leg portion, and a seal wall for connecting ends of the extending portions into an arc-shaped cross-section. The base portion and the leg portions are integrally composed of a solid rubber-like resilient material while the seal wall is composed of a sponge rubber-like resilient material. A boundary between the solid rubber-like resilient material and the sponge rubber-like resilient material is located in each of the extending portions of the seal portion.

The extending portions are arranged so as to extend in approximately parallel to a seal face of a closing member such as a slide door, which is in its closed position. Since the boundaries between solid parts and sponge parts are located in the extending portions, scattering in the position of the boundaries scarcely affects the sealing pressure of the seal wall. Furthermore, where the seal face of the closing member largely presses the seal wall of the weather strip upon closing the opening in the vehicle body, the extending portions flex at about corners between the extending portions and the leg portions to release a counterforce which would be exerted by the solid parts against the seal face of the closing member. In addition, where the seal face of the closing member presses the seal wall obliquely, the extending portions including the solid parts retain their shapes thereagainst to prevent the seal wall from entirely falling down toward the base portion.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
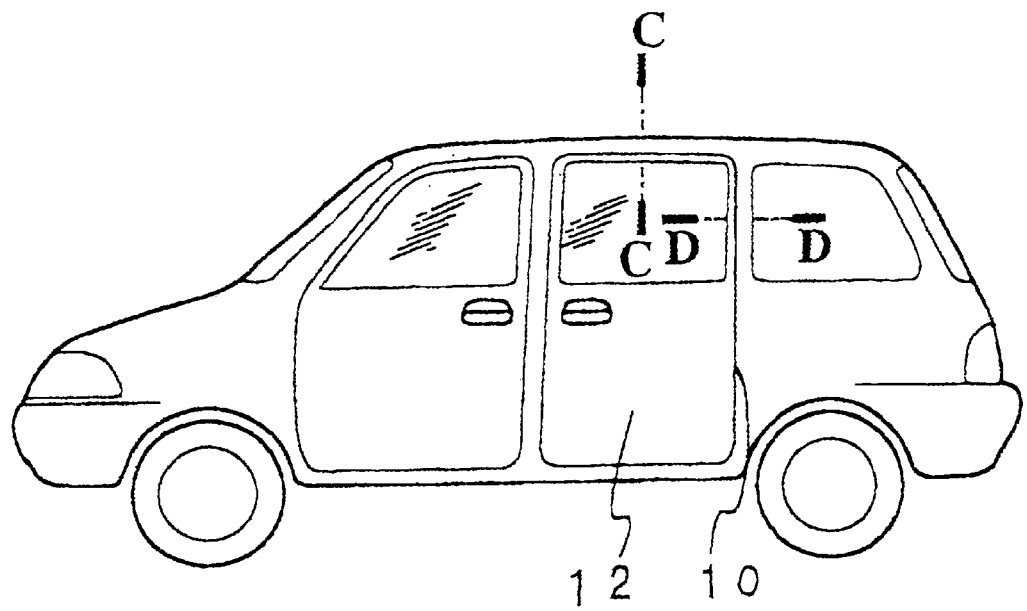
FIG. 1 is a side view of a motor vehicle to which a weather strip in accordance with the present invention is to be attached.
Figure 2:
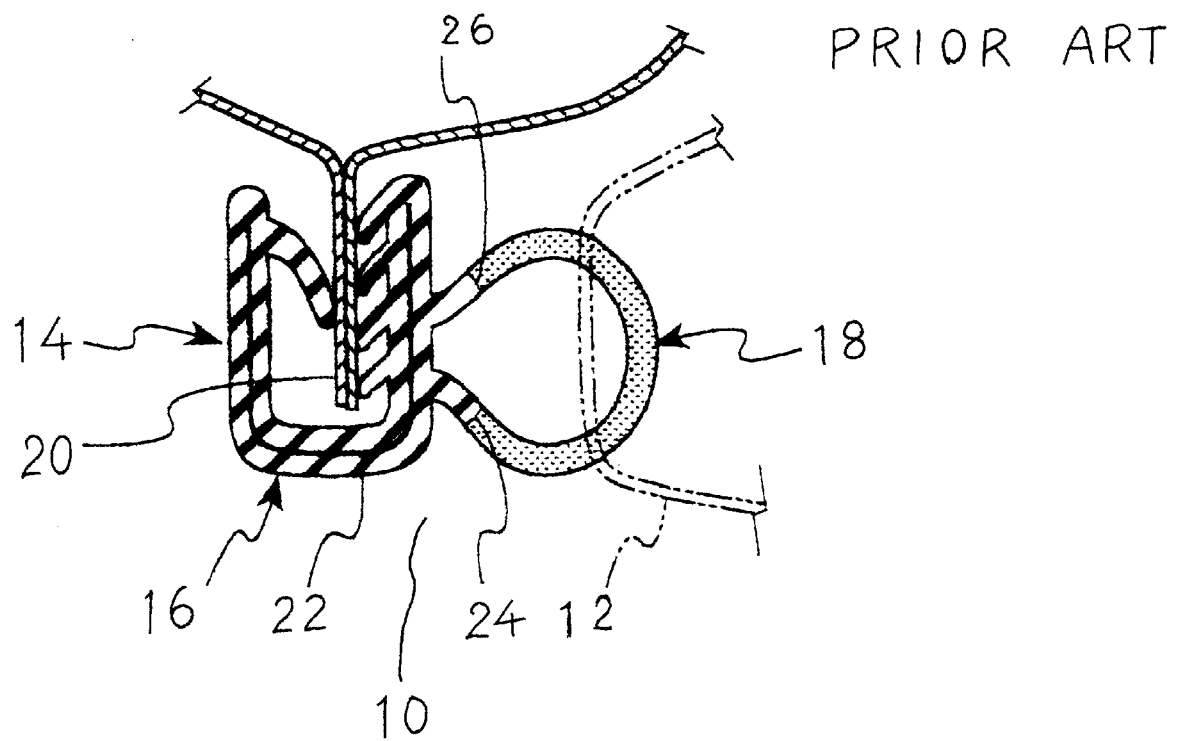
FIG. 2 is a cross-sectional view showing the attaching state of a conventional weather strip, to the motor vehicle of FIG. 1, which is taken along the line C—C thereof.
Figure 3:
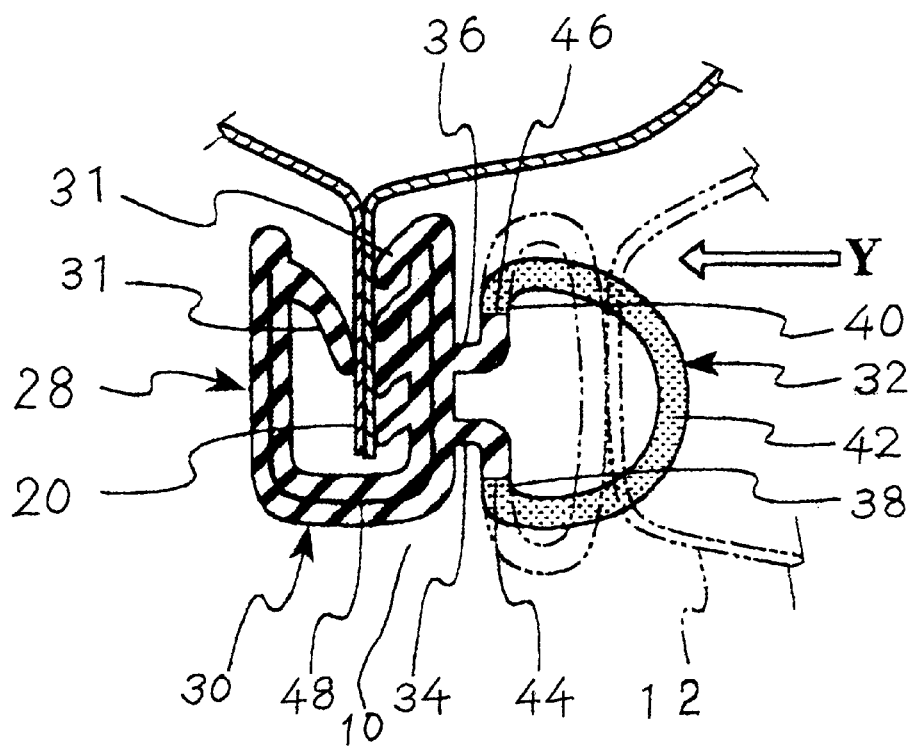
FIG. 3(A) is a cross-sectional view showing the attaching state of a weather strip in accordance with the present invention, to the motor vehicle of FIG. 1, which is taken along the line C—C thereof.
FIG. 3(B) is a cross-sectional view of the weather strip of FIG. 3(A) of which a seal portion is pressed by a closing member.
Figure 3:
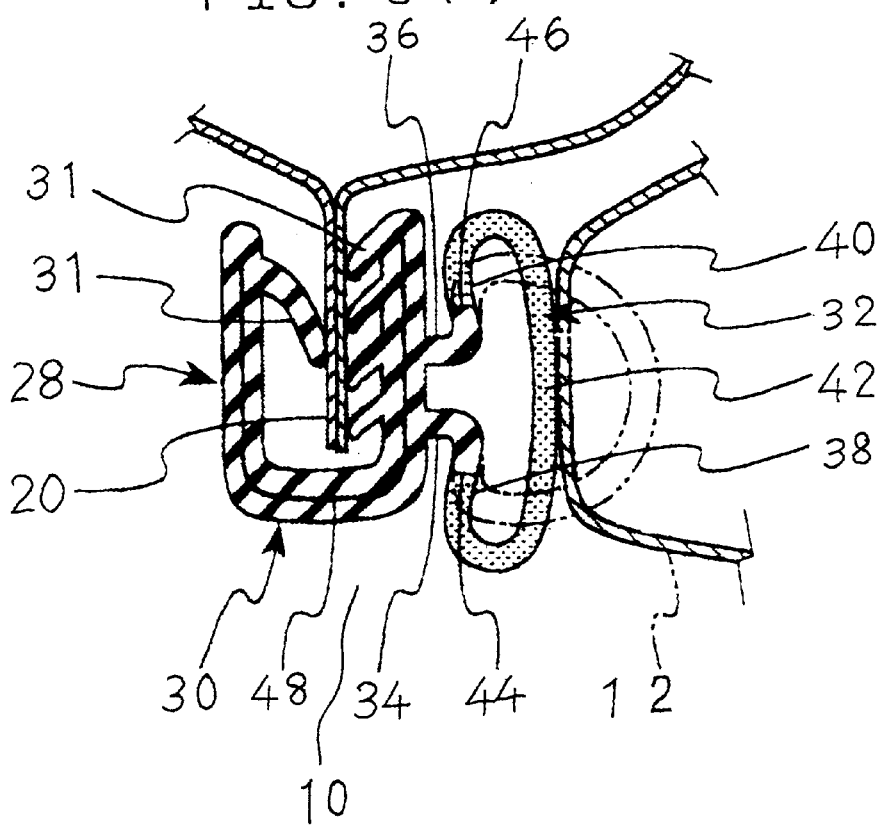

FIG. 3(A) illustrates a cross-section of a weather strip in accordance with the present invention, which is taken along the line C—C of FIG. 1. A flange 20 composed of end portions of an inner and outer body panels projects into a door opening 10 in directions along a side-face of a vehicle body.

A weather strip 28 includes a base portion 30 which has a generally U-shaped cross-section and a tubular seal portion 32 which projects from an outer surface of an outer side wall of the base portion 30. The weather strip 28 is attached to the flange 20 by holding the flange 20 with lips 31 which projects from opposite inside faces of the base portion 30. The seal portion 32 expands outwardly of the vehicle body. When the door opening 10 is closed by a slide door 12, in the final stage of the door closing operation, the seal portion 32 is pressed by an inside face of a doorframe of the slide door 12 which is guided inwardly of the vehicle body (in the direction of arrow Y).

The seal portion 32 includes a pair of leg portions 34 and 36 which project from the outer surface of the outer side wall of the base portion 30 toward a pressing face of the doorframe pressed on the seal portion 32, extending portions 38 and 40 which extend from ends of the leg portions 34 and 36 in opposite directions along the outer side wall of the base portion 30 to define an L-shaped cross-section with the leg portions 34 and 36, respectively, and a seal wall 42 which connects ends of the extending portions 38 and 40 into an arc-shaped cross-section. Each of the extending portions 38 and 40 extends in approximately parallel to the pressing face of the doorframe in directions approximately perpendicular to the pressing direction of the doorframe.

The weather strip 28 is composed of a solid EPDM rubber and a sponge EPDM rubber. Boundaries 44 and 46 between the solid EPDM rubber and the sponge EPDM rubber are located in about the middle of the extending portions 38 and 40 The base portion 30 and the leg portions 34 and 36 along with parts of the extending portions 38 and 40 on the side of the leg portions 34 and 36 are integrally composed of the solid EPDM rubber. The seal wall 42 along with the remaining parts of the extending portions 38 and 40 are integrally composed of the sponge EPDM rubber. A metal core 48 is embedded in the base portion 30.

The weather strip 28 is integrally formed by extrusion. Upon extruding, the positions of the boundaries 44 and 46 inevitably vary because of scattering in the supply amounts of the solid and sponge EPDM rubbers, or other reasons. With the present invention, since the extending portions 38 and 40 are formed to have a sufficient width of about 3 to 8 mm, the positions of the boundaries 44 and 46 do not scatter beyond the extending portions 38 and 40. Thus, the extending portions 38 and 40 serve to cancel scattering in the positions of the boundaries 44 and 46.

Upon closing the door opening 10 by the slide door 12, in the final stage of the door closing operation, the slide door 12 is guided inwardly of the vehicle body. At this time, the inside face of the slide door 12 presses the seal wall 42 toward the outer side wall of the base portion 30. In this case, where the positions of the boundaries 44 and 46 vary in the extending portions 38 and 40, the relation between the pressing amount of the slide door 12 and the resultant sealing pressure of the seal wall 42 is kept nearly constant, because the extending portions 38 and 40 extend in approximately parallel to the pressing face of the slide door 12. Accordingly, if the positions of the boundaries 44 and 46 in products of extruded weather strips differ from one another, they exhibit approximately identical sealing performance. In addition, if the positions of the boundaries 44 and 46 vary in the longitudinal direction of each of products of extruded weather strips, uniform sealing performance can be obtained over the entire length thereof. When the pressing amount of the slide door 12 against the seal wall 42 is large, as illustrated in FIG. 3(B), the extending portions 38 and 40 flex at about corners with the leg portions 34 and 36, and accordingly, the seal wall 42 does not exert an increased counterforce against the pressing force of the slide door 12 so as to prevent the slide door 12 from strongly striking on the seal wall 42.

Figure 4:
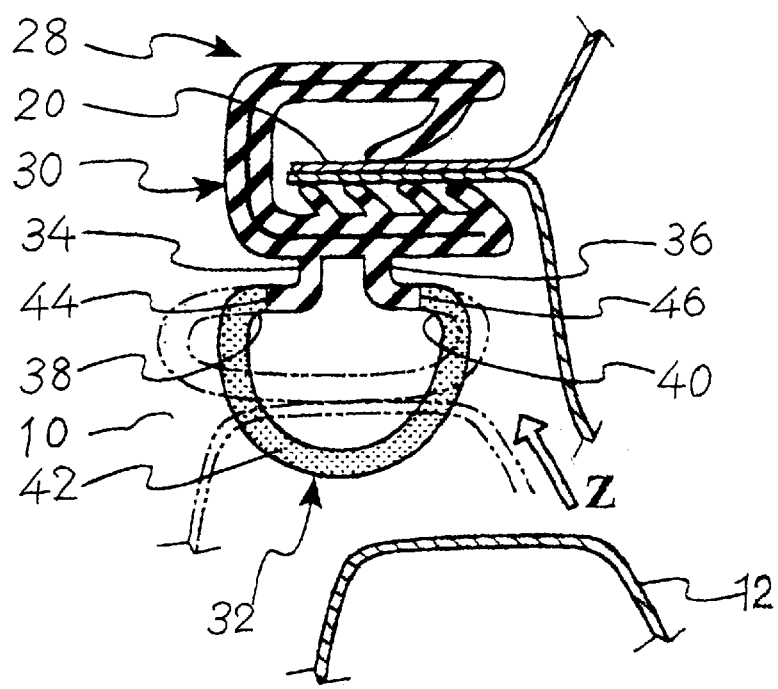
FIG. 4 is a cross-sectional view showing the attached state of a weather strip in accordance with the present invention, to the motor vehicle of FIG. 1, which is taken along the line D—D thereof, along with the deformation of a seal portion thereof.

In the preceding description, the weather strip which is attached along a roof-side of a door opening in a vehicle body has been explained. FIG. 4 illustrates the weather strip which is attached along a rear pillar defining the door opening 10. When the door opening 10 is closed, the seal portion 32 of the weather strip 28 is pressed by an inside face of a periphery of the slide door 12 from the rear side of the vehicle body obliquely (in the direction of arrow Z). At this time, the leg portion 36 and extending portion 40 which define an L-shaped cross-section endures the pressing force of the slide door 12. Accordingly, the seal portion 32 is prevented from largely falling down toward the outer side wall of the base portion 30, thereby achieving good sealing properties.

Figure 5:
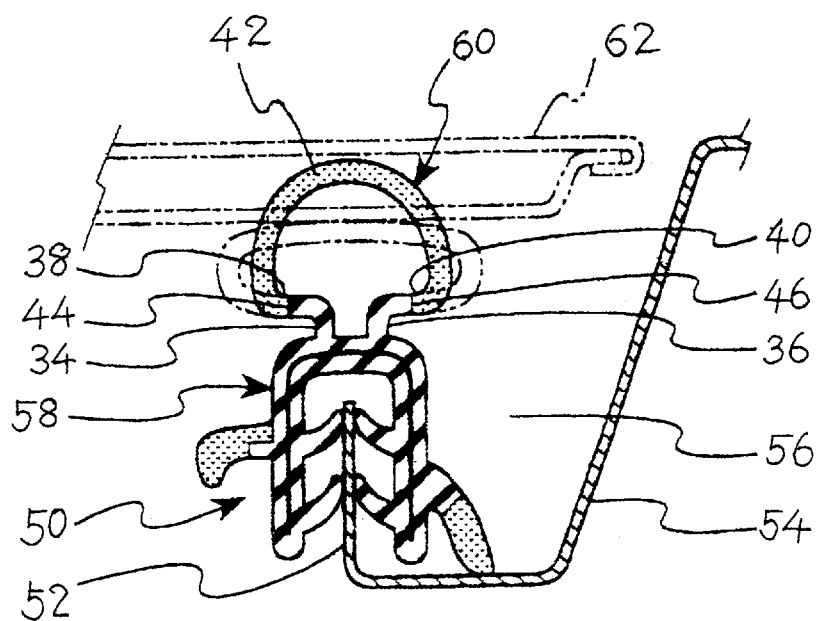
FIG. 5 is a cross-sectional view of a weather strip in accordance with the present invention, which is applied to a trunk room of a motor vehicle.

The weather strip in accordance with the present invention is also attached around other openings in a vehicle body. FIG. 5 illustrates an embodiment wherein the weather strip in accordance with the present invention is attached around a trunk room provided in a rear body of a motor vehicle. A weather strip 50 is attached to a flange 52 which is provided in a peripheral wall 54 defining a trunk room 56.

The weather strip 50 includes a base portion 58 having an inverted U-shaped cross-section and a tubular seal portion 60 which projects from an outer surface of a bottom wall of the base portion 58. The remainder of the structure of the weather strip 50 is substantially identical to that of the weather strip 28 illustrated in FIGS. 3(A), 3(B) and 4. Parts similar to those in the weather strip 28 are given the same number as in FIGS. 3(A), 3(B) and 4.

When the trunk room 56 is closed by a trunk lid 62, the seal portion 60 of the weather strip 50 is pressed by an inside face of a periphery of the trunk lid 62, and deforms, similarly to the case of the weather strip 28. Thus, the weather strip 50 achieves the operational advantages similar to those of the weather strip 28.

In the preceding weather strips 28 and 50, the base portions 30 and 58 respectively have a U-shaped cross-section. The present invention is also applicable to the weather strip of which a base portion has a thick plate-like configuration. This type of the weather strip is attached around an opening in a vehicle body, or along a periphery of a closing member for closing the opening by using a retainer or a double-sided adhesive tape.

With the present invention, if the positions of boundaries between the solid material and the sponge material scatter, uniform sealing properties can be maintained. In addition, where the seal portion is largely pressed by a closing member for closing a body opening, the counterforce exerted by the seal portion does not increase, whereby the closing member can be prevented from strongly striking on the seal portion upon closing the body opening.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip to be attached to at least one of an opening portion of a vehicle body around an opening therein and a periphery of a closing member for closing the opening in the vehicle body, comprising:

a base portion; and a tubular seal portion which projects from said base portion, said tubular seal portion including a pair of leg portions which project from said base portion approximately perpendicularly to an outer surface of said base portion, extending portions which extend from projecting ends of said leg portions in opposite directions along said outer surface of said base portion, and terminal ends of a seal wall connecting extending ends of said extending portions into an arc-shaped cross-section, said base portion, said leg portions and one part of each of said extending portions, which is connected to said leg portions, being composed of a solid rubber-like resilient material, while said seal wall and a remaining part of each of said extending portions, which is connected to said seal wall, being composed of a sponge rubber-like resilient material, such that a boundary between said solid rubber-like resilient material and said sponge rubber-like resilient material is located in each of said extending portions.

2. A weather strip as claimed in claim 1, wherein said extending portions extend in approximately parallel to a seal face of the closing member, which is to press said seal wall of said tubular seal portion, and said boundary is located in about a middle of each of said extending portions.

3. A weather strip as claimed in claim 1, wherein said base portion has a generally U-shaped cross section, and is attached to a flange provided in the opening portion around the opening, and each of said leg portions and each of said extending portions form an L-shaped cross-section.

4. A weather strip as claimed in claim 2, wherein the opening in the vehicle body is a door opening formed in a side-face of the vehicle body, and the closing member is a door.

5. A weather strip as claimed in claim 2, wherein the opening in the vehicle body is an opening of a trunk room of the vehicle body, and the closing member is a trunk lid.

* * * * *